(12) United States Patent
Lin

(10) Patent No.: US 8,020,987 B2
(45) Date of Patent: Sep. 20, 2011

(54) SUNGLASSES STRUCTURE

(75) Inventor: Kuo-Tseng Lin, Taipei (TW)

(73) Assignee: T-Link PPE Ltd., Taipei (TW)

( * ) Notice: Subject to any disclaimer, the term of this patent is extended or adjusted under 35 U.S.C. 154(b) by 0 days.

(21) Appl. No.: 12/698,298

(22) Filed: Feb. 2, 2010

(65) Prior Publication Data

US 2011/0187985 A1 Aug. 4, 2011

(51) Int. Cl.
*G02C 7/10* (2006.01)
(52) U.S. Cl. ............... 351/44; 351/47; 351/86; 351/154
(58) Field of Classification Search .................. 351/41, 351/44, 47, 48, 57, 58, 103–109, 154
See application file for complete search history.

(56) References Cited

U.S. PATENT DOCUMENTS

| | | | | |
|---|---|---|---|---|
| 5,980,036 A | * | 11/1999 | Solomon | 351/47 |
| 6,234,627 B1 | * | 5/2001 | Agnoli | 351/47 |
| 2005/0001976 A1 | * | 1/2005 | Yinkai et al. | 351/57 |

* cited by examiner

*Primary Examiner* — Huy K Mai
(74) *Attorney, Agent, or Firm* — WPAT, P.C.; Anthony King

(57) ABSTRACT

A sunglasses structure includes a glasses frame, having a position limit slot disposed at an internal edge of the glasses frame and a plurality of assembling portions disposed on an outward side of the position limit slot at the internal edge of the glasses frame; two glasses legs, pivotally coupled to either side of the glasses frame; at least one first lens, installed in the position limit slot of the glasses frame; and at least one second lens, installed outside the first lens, and having a plurality of connecting portions disposed at the periphery of the second lens and coupled to the assembling portions. The sunglasses structure uses the assembling portions at the internal edge of the glasses frame together with the connecting portions at the periphery of the second lens to achieve the effects of shading sunlight, preventing image distortion, and providing a secured mount and an easy dismount.

20 Claims, 16 Drawing Sheets

SUNGLASSES STRUCTURE

FIELD OF THE INVENTION

The present invention relates to a sunglasses structure, in particular to a sunglasses structure having a second lens with the effects of shading sunlight, preventing image distortion, and providing a secured mount and an easy dismount.

BACKGROUND OF THE INVENTION

In general, a conventional combination sunglasses structure is composed of a glasses frame and two glasses legs, wherein the glasses frame includes a first lens, a pair of corresponding nose pads disposed on an internal side of the glasses frame, and a second lens movably installed onto an external side of the glasses frame and corresponding to the first lens, wherein the second lens includes a clip disposed at the middle of the top of the second lens and clipped onto the glasses frame, or pivotally coupled to a pivotal coupling portion of the glasses frame, or attached onto a magnet installed on the glasses frame, or the second lens is a soft plastic plate that can be attached with the first lens by static electricity. Therefore, with the combination of the glasses frame, the nose pad, the first lens and the glasses legs, a user can wear the sunglasses. In addition, by clipping the second lens onto the glasses frame, connecting the pivotal coupling portion of the second lens onto the glasses frame, attaching the magnet of the second lens onto the glasses frame, or by using the electrostatic effect between the soft plastic plate and the first lens, the second lens is installed onto the first lens for the effects of shading sunlight and resisting ultraviolet light.

Although the conventional combination sunglasses structure can use the second lens for shading sunlight and resisting ultraviolet light, yet an image deviation or distortion may be easily resulted from the gap between the first and second lens that is produced after the second lens is installed. Furthermore, if the second lens is clipped onto the glasses frame, or attached onto the glasses frame by the magnet, the gap between the first lens and the second lens and the weight of the second lens may cause the second lens to shake easily, such that the second lens cannot be clipped securely onto the glasses frame, nor securely attached onto the glasses frame by the magnet. In the worse case, the second lens may fall off. Besides, in order to secure the second lens onto the glasses frame, a lever clip or a magnet installed onto the second lens is used for clipping or attaching the second lens onto the glasses frame, and thus the second lens cannot be detached easily when needed. Even if the pivotal coupling portion at the middle of the second lens is pivotally coupled to the glasses frame, the second lens can only be lifted up to a horizontal level and cannot be detached when the second lens is not in use, and it results in a poor overall appearance. Furthermore, if the wearer has any sudden and severe movement, the second lens will be flipped downward due to the gravitational force, and it results in an inconvenient application. If the second lens is a soft plastic plate attached onto the first leans by electrostatic effect, the soft plastic plate may be deformed easily to give improper refraction of light and result in an image distortion.

Therefore, it is a main subject for the present invention to disclose a sunglasses structure to achieve the effects of shading sunlight by the second lens without any image distortion, and providing a secured mount and an easy dismount.

SUMMARY OF THE INVENTION

In view of the aforementioned shortcomings of the prior art, the inventor of the present invention based on years of experience in the related industry to conduct extensive researches and experiments, and finally developed a sunglasses structure to achieve the effects of shading sunlight, preventing image distortion, and providing a secured mount and an easy dismount.

Therefore, it is a primary objective of the present invention to provide a sunglasses structure having assembling portions disposed at an internal edge of the glasses frame and connecting portions disposed at the periphery of the second lens for combining and separating the second lens and the glasses frame to achieve the effects of shading sunlight by the second lens, preventing image distortion, and providing a secured mount and an easy dismount.

To achieve the foregoing objectives, the present invention provides a sunglasses structure, comprising: a glasses frame, a position limit slot and a plurality of assembling portions disposed at an internal edge of the glasses frame, and the assembling portions being disposed on an outward side of the position limit slot; two glasses legs, respectively and pivotally coupled to either side of the glasses frame; at least one first lens, installed in the position limit slot of the glasses frame; and at least one second lens, installed outside the first lens, and a plurality of connecting portions disposed at the periphery of the second lens to be coupled to the assembling portions respectively.

Therefore, the sunglasses structure of the present invention can use the assembling portions disposed at the internal edge of the glasses frame together with the connecting portions disposed at the periphery of the second lens to achieve the effects of shading sunlight by the second lens, preventing image distortion, and providing a secured mount and an easy dismount.

DESCRIPTION OF THE PREFERRED EMBODIMENTS

To make it easier for the examiner to understand the objects, characteristics and effects of this invention, we use preferred embodiments together with the attached drawings for the detailed description of the invention as follows.

Figure 1:
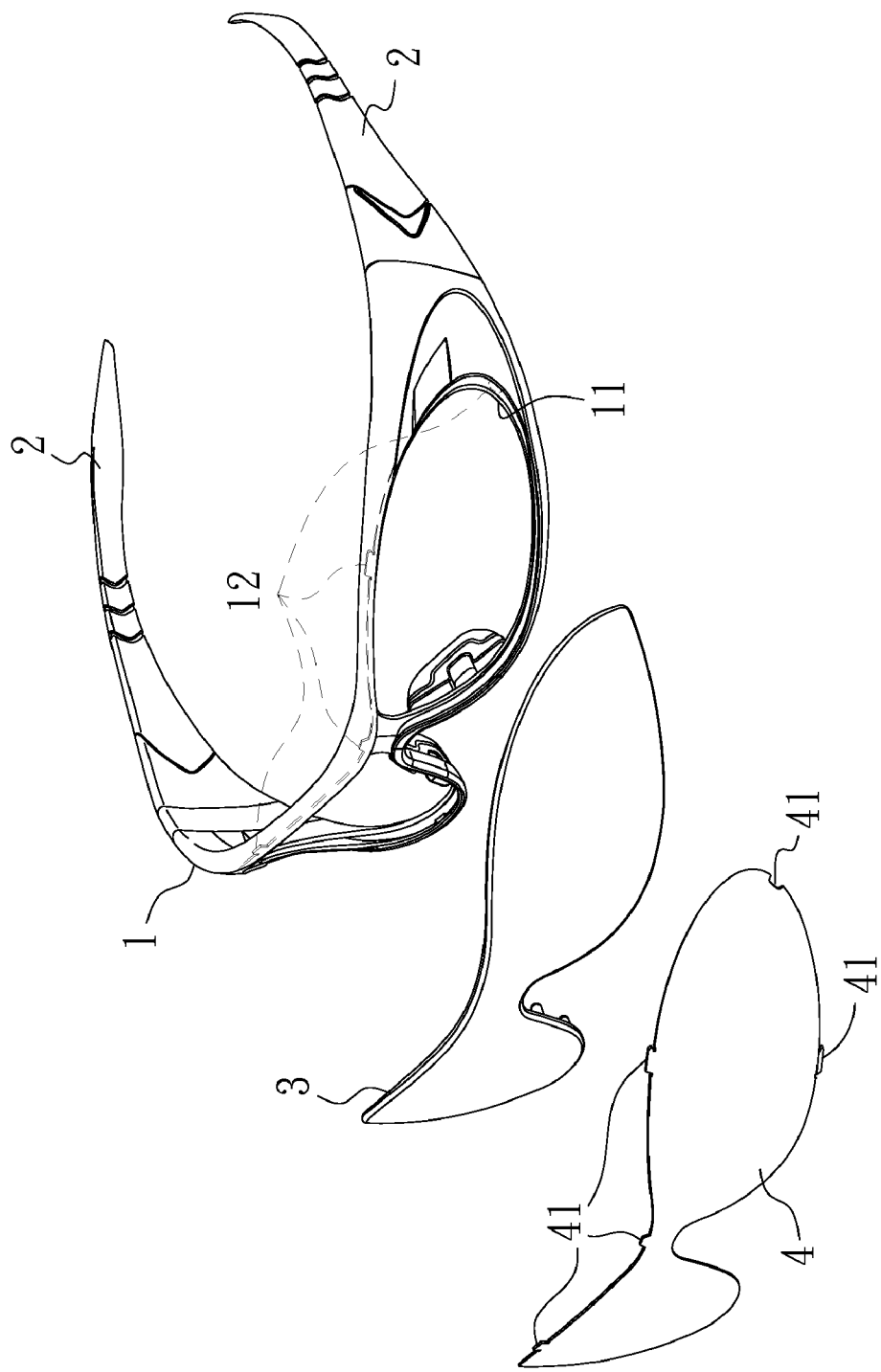
FIG. 1 is an exploded view of a preferred embodiment of the present invention.
Figure 2:
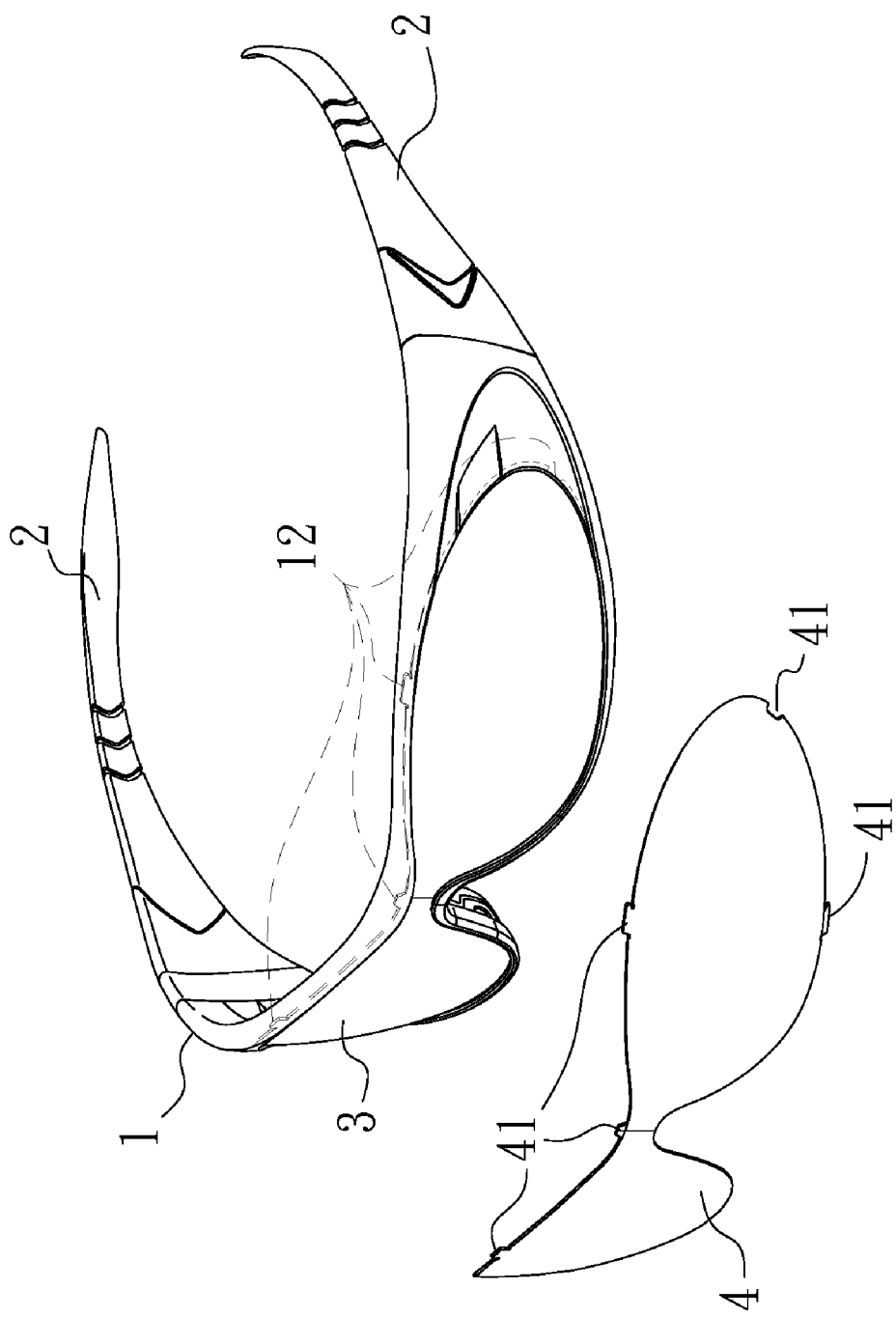
FIG. 2 is a first perspective view of a preferred embodiment of the present invention.
Figure 3:
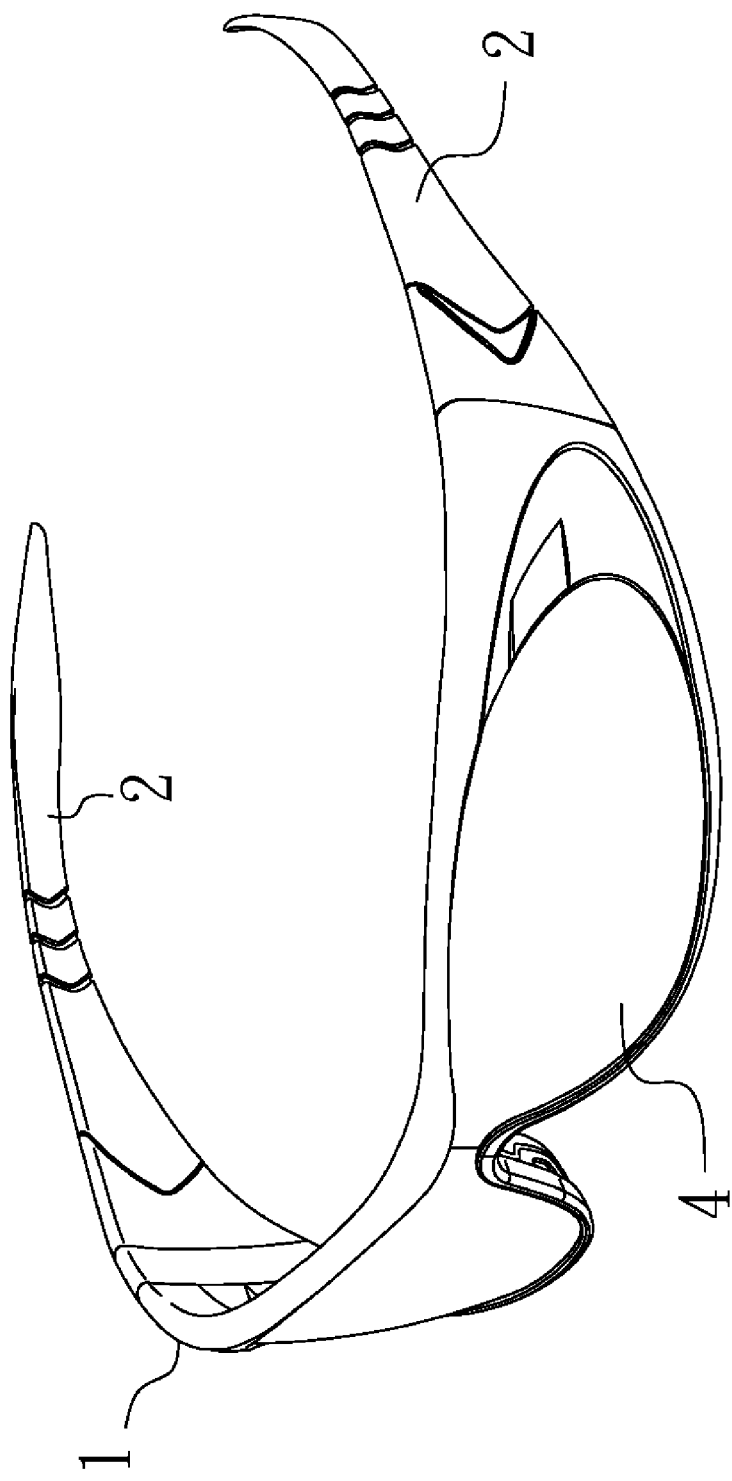
FIG. 3 is a second perspective view of a preferred embodiment of the present invention.
Figure 4:
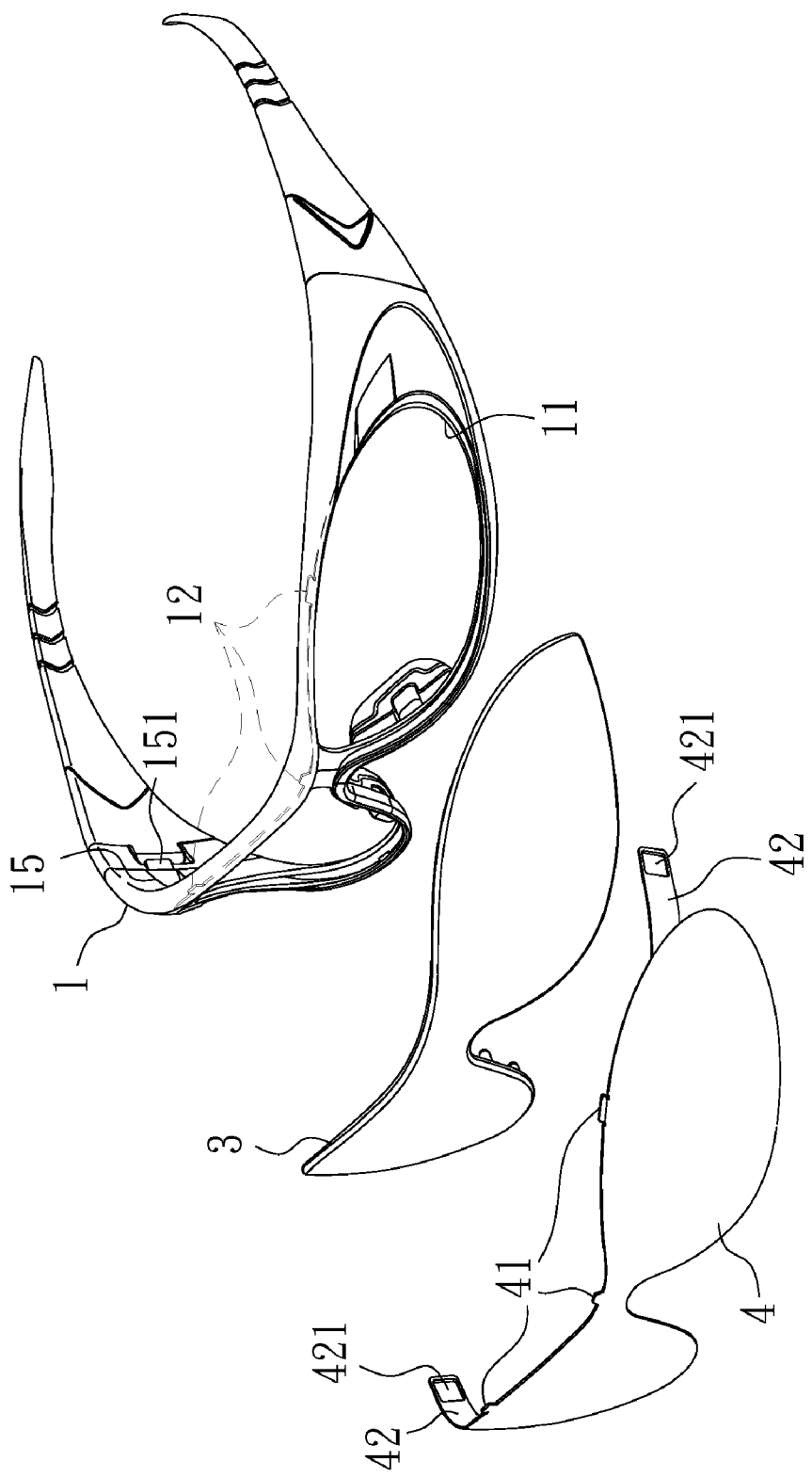
FIG. 4 is an exploded view of another preferred embodiment of the present invention.
Figure 5:
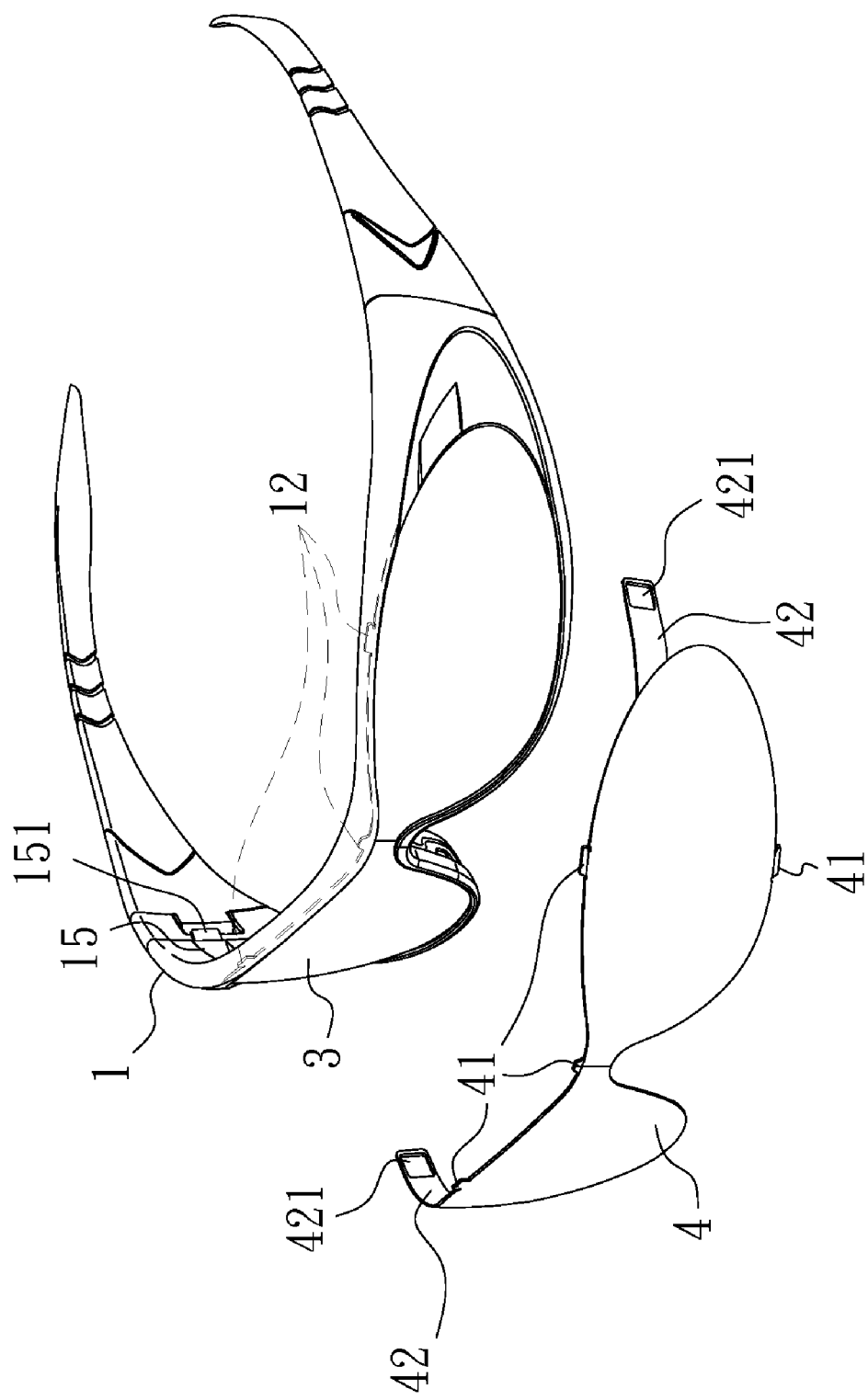
FIG. 5 is a first perspective view of another preferred embodiment of the present invention.
Figure 6:
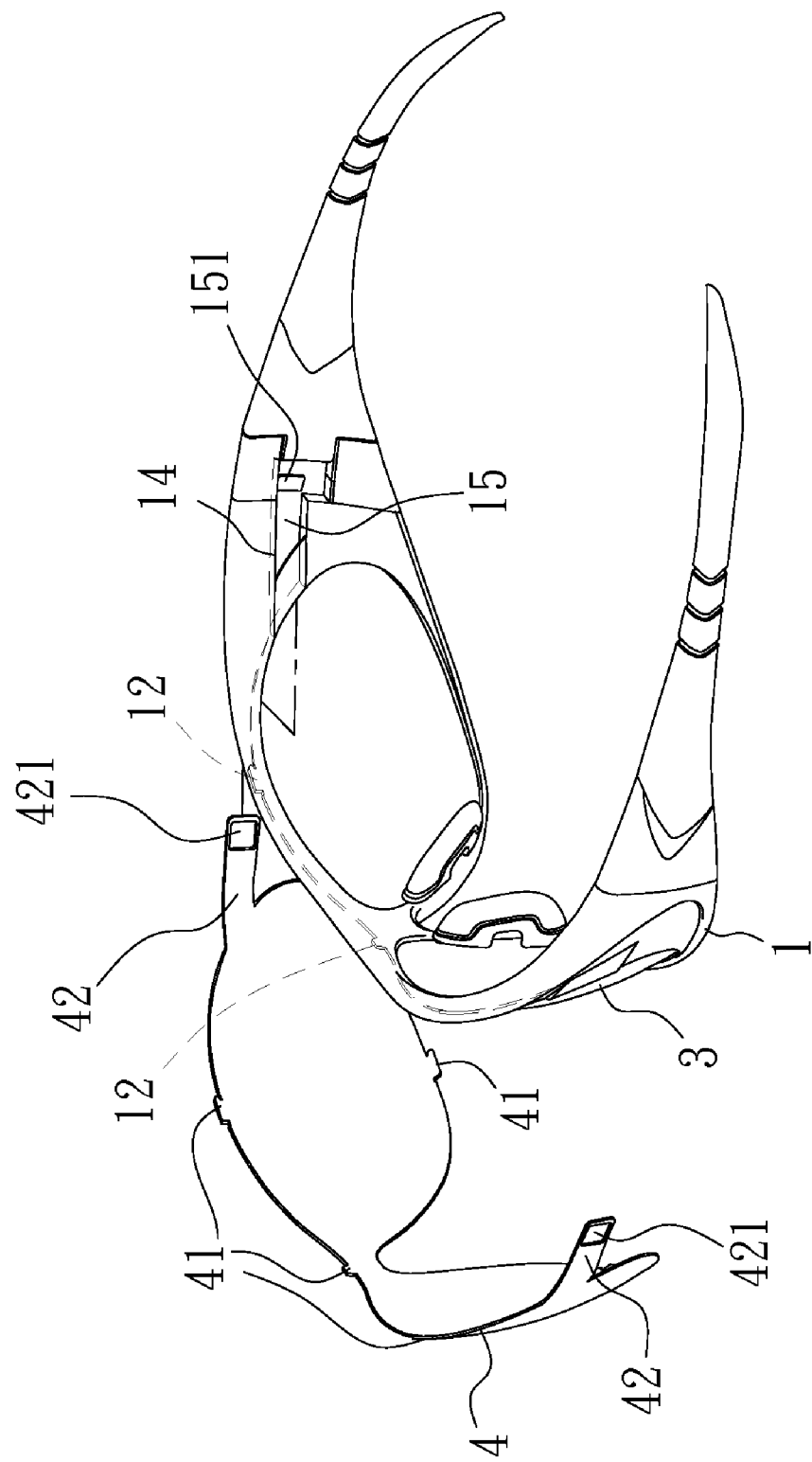
FIG. 6 is a second perspective view of another preferred embodiment of the present invention.
Figure 7:
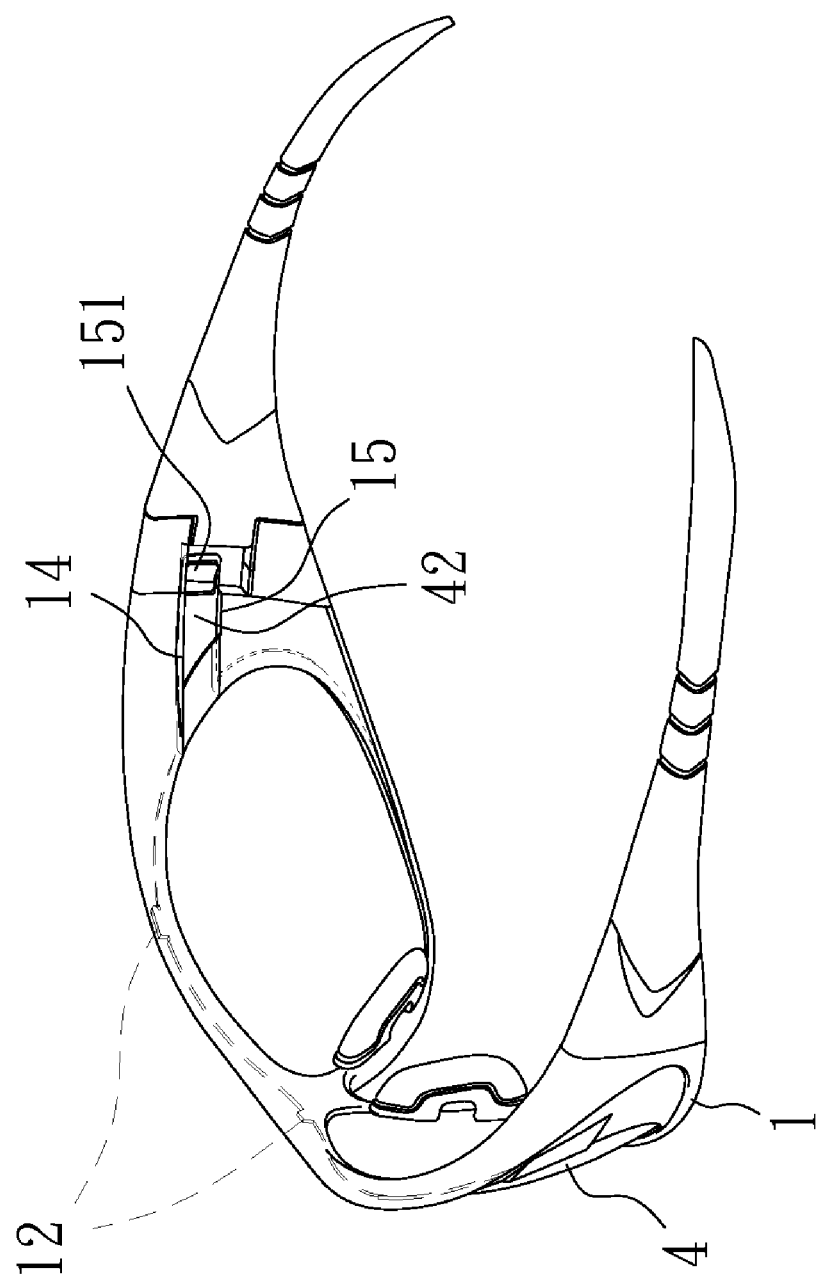
FIG. 7 is a third perspective view of another preferred embodiment of the present invention.
Figure 8:
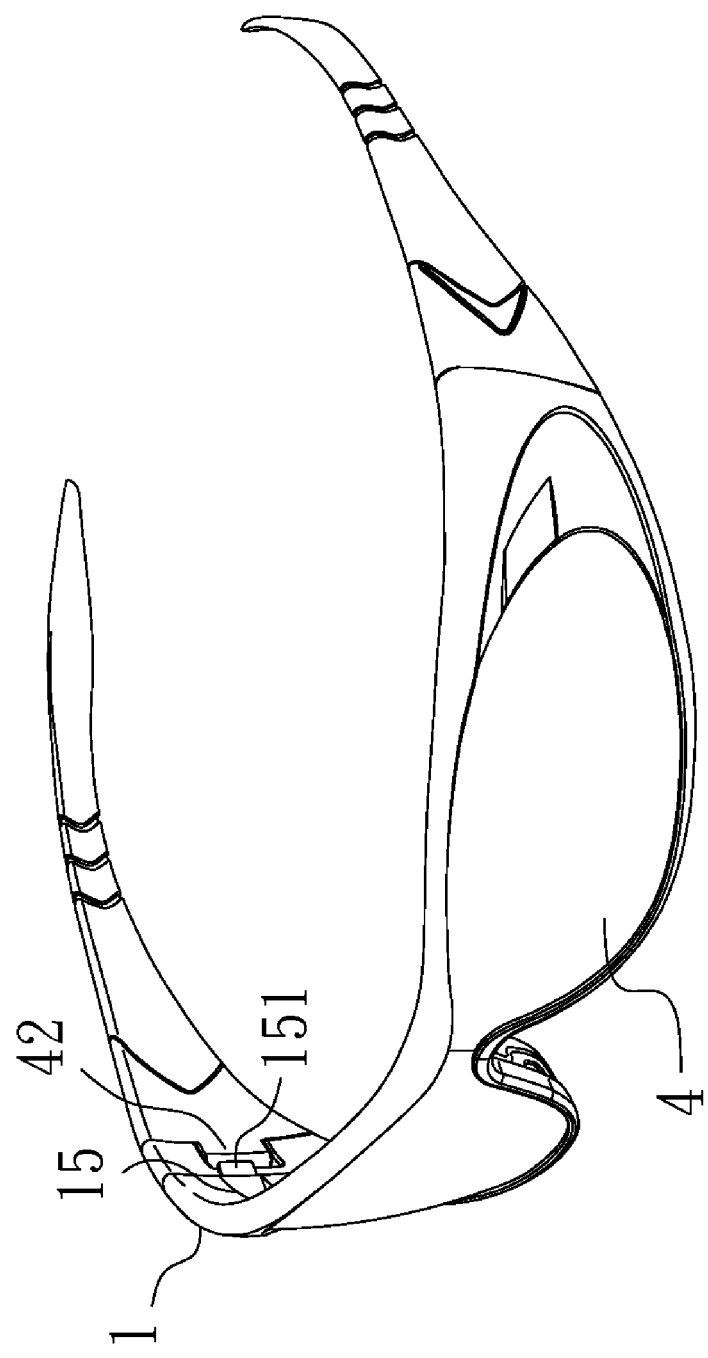
FIG. 8 is a fourth perspective view of another preferred embodiment of the present invention.

With reference to FIGS. 1 to 3 for an exploded view and perspective views of a sunglasses structure in accordance with a preferred embodiment of the present invention, the sunglasses structure comprises a glasses frame 1, two glasses legs 2, at least one first lens 3 and at least one second lens 4, wherein a position limit slot 11 and a plurality of assembling portions 12 are disposed at an internal edge of the glasses frame 1, and the assembling portions 12 are disposed on an outward side of the position limit slot 11, and ends of the glasses legs 2 are respectively and pivotally coupled to either side of the glasses frame 1, and the first lens 3 is installed in the position limit slot 11 of the glasses frame 1, and the second lens 4 is installed outside the first lens 3, and the second lens 4 includes a plurality of connecting portions 41 disposed at the periphery of the second lens 4 and coupled to the assembling portions 12 respectively.

With the aforementioned structural design, the first lens 3 is installed in the position limit slot 11, and the second lens 4 is coupled to the assembling portions 12 outside the position limit slot 11 by the connecting portions 41 at the periphery of the second lens 4, such that the second lens 4 can be installed outside the first lens 3 and the first lens 3 and the second lens 4 are connected closely with each other, and images passing through the first lens 3 and the second lens 4 will not be distorted, and the second lens 4 can be installed securely or detached easily by connecting or detaching the assembling portions 12 and the connecting portions 41.

In addition, the first lens 3 and the second lens 4 can be cylindrical lenses, such that the first lens 3 and the second lens 4 can be engaged easier, and the second lens 4 can be installed more securely and detached more easily.

Further, the first lens 3 and the second lens 4 can be engaged closely by the electrostatic effect of an air press effect, such that the second lens 4 can be installed onto the first lens 3 more securely.

With reference to FIGS. 4 to 8 for an exploded view and perspective views of another preferred embodiment of the present invention, the difference of this embodiment from the embodiment as shown in FIGS. 1 to 3 resides on that a position limiting hole 14 penetrates through either side of the glasses frame 1 separately, and the position limiting holes 14 can be a slender rectangular hole formed on an internal side of the glasses frame 1, and an accommodating slot 15 is formed at adjacent sides of the position limiting holes 14, and a latch portion 151 is disposed separately in the accommodating slots 15, and the latch portions 151 can be wedge-shaped members, and both sides of the second lens 4 respectively have an extended section 42 passed into the position limiting hole 14 and contained in the accommodating slot 15, and the extended sections 42 respectively have a fixing hole 421 fixed to the latch portion 151. In the aforementioned structural design, when the second lens 4 is installed to the glasses frame 1, the connecting portions 41 can be connected to the assembling portions 12, or the extended sections 42 on both sides of the second lens 4 are penetrated through the position limiting hole 14 and contained in the accommodating slot 15, and then the fixing hole 421 of the extended section 42 is sheathed into the latch portion 151, such that the second lens 4 can be installed securely to the glasses frame 1. If it is necessary to detach the second lens 4, users simply lift and separate the extended sections 42 from the latch portions 151, and push the extended sections 42 outward to separate the connecting portions 41 from the assembling portions 12 in order to detach the second lens 4.

The aforementioned glasses frame 1 can be interconnected integrally, and the first lens 3 and the second lens 4 form a whole-piece lens respectively to fit into the glasses frame 1.

Figure 9:
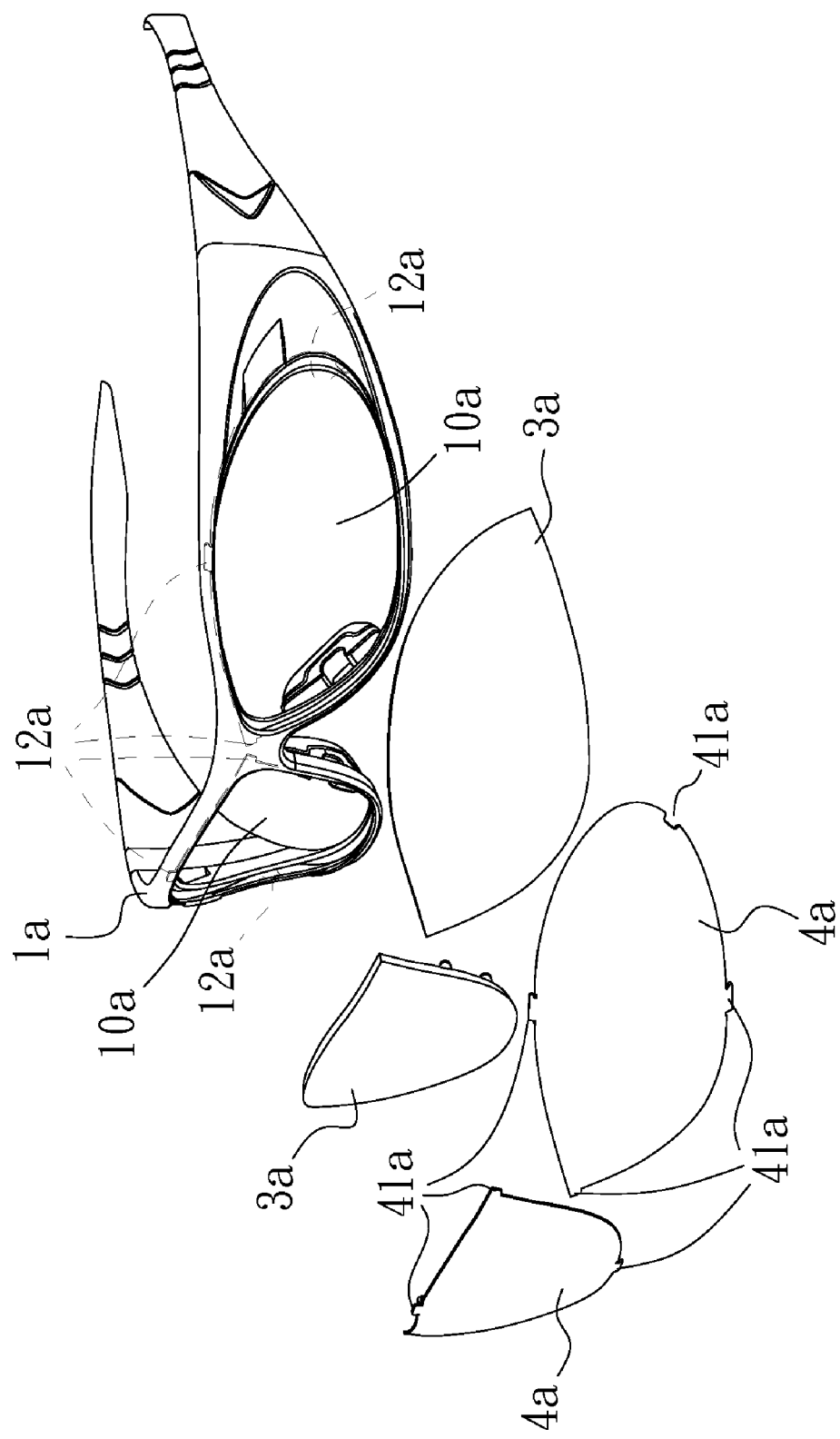
FIG. 9 is an exploded view of a preferred embodiment of the present invention.
Figure 10:
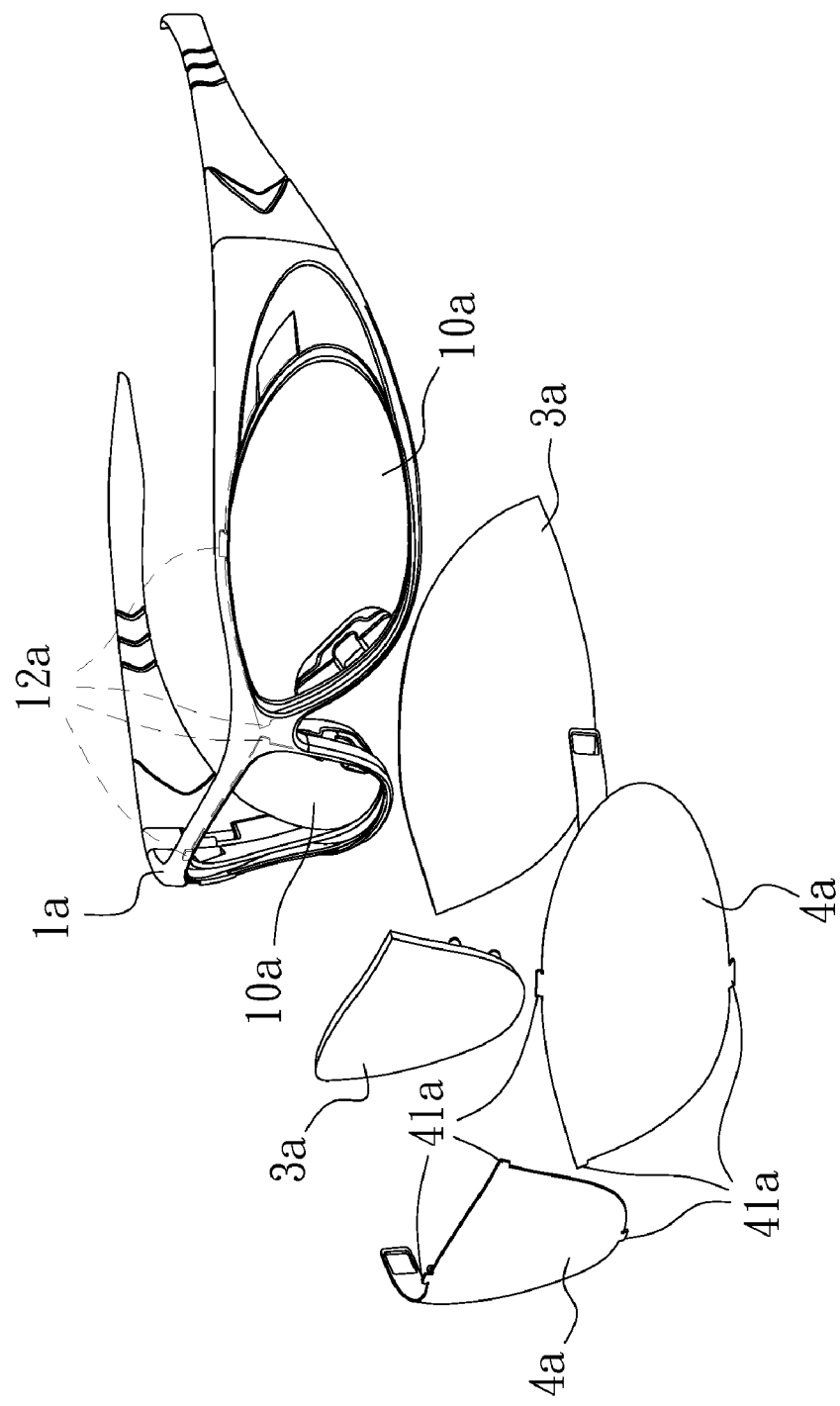
FIG. 10 is an exploded view of another preferred embodiment of the present invention.

With reference to FIGS. 9 and 10 for exploded views of a preferred embodiment and another preferred embodiment of the present invention, the difference of this embodiment from those as shown in FIGS. 1 to 8 resides on that the glasses frame 1a includes two frame bodies 10a disposed adjacent to each other, and the first lens 3a and the second lens 4a are two separate lenses to fit into the frame bodies 1a.

Figure 11:
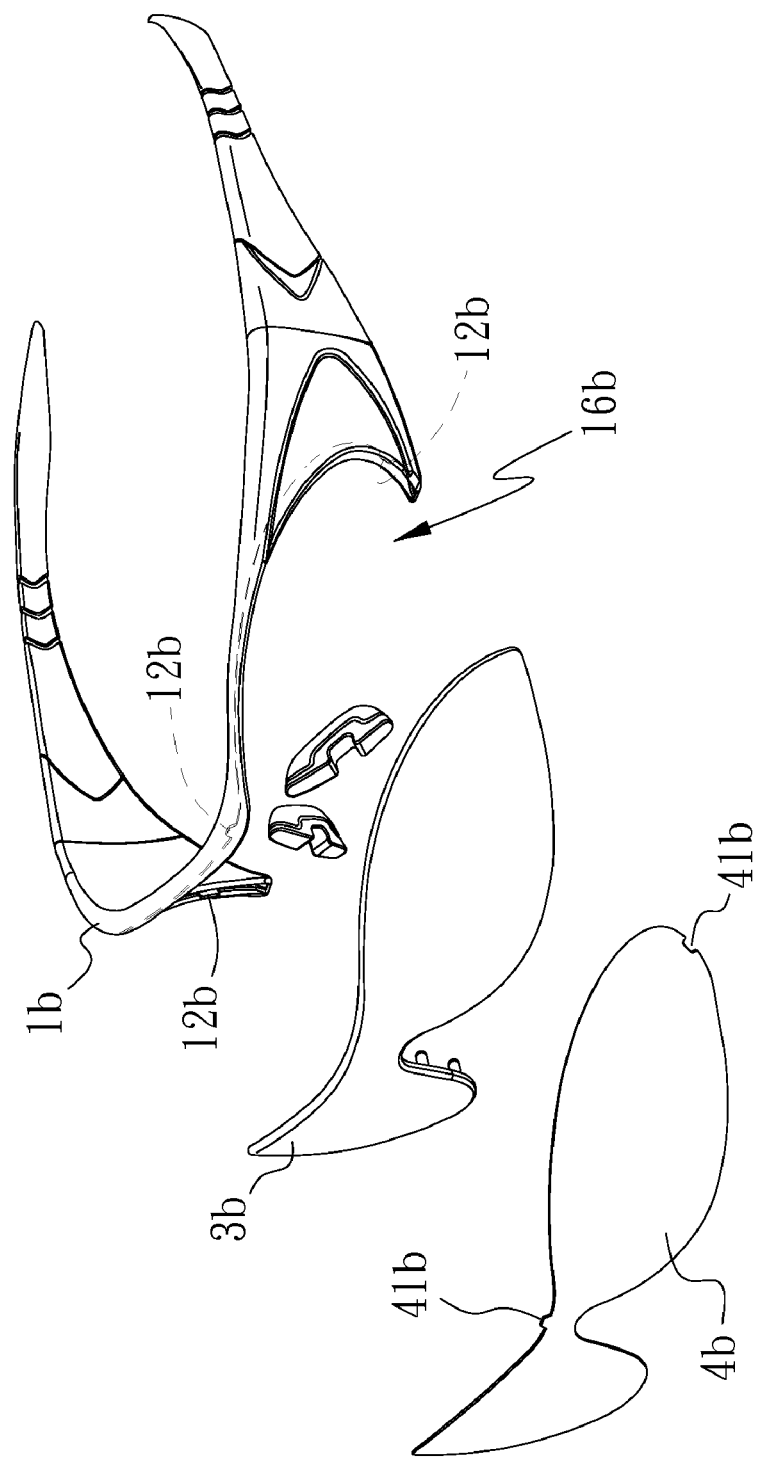
FIG. 11 is an exploded view of a preferred embodiment of the present invention.
Figure 12:
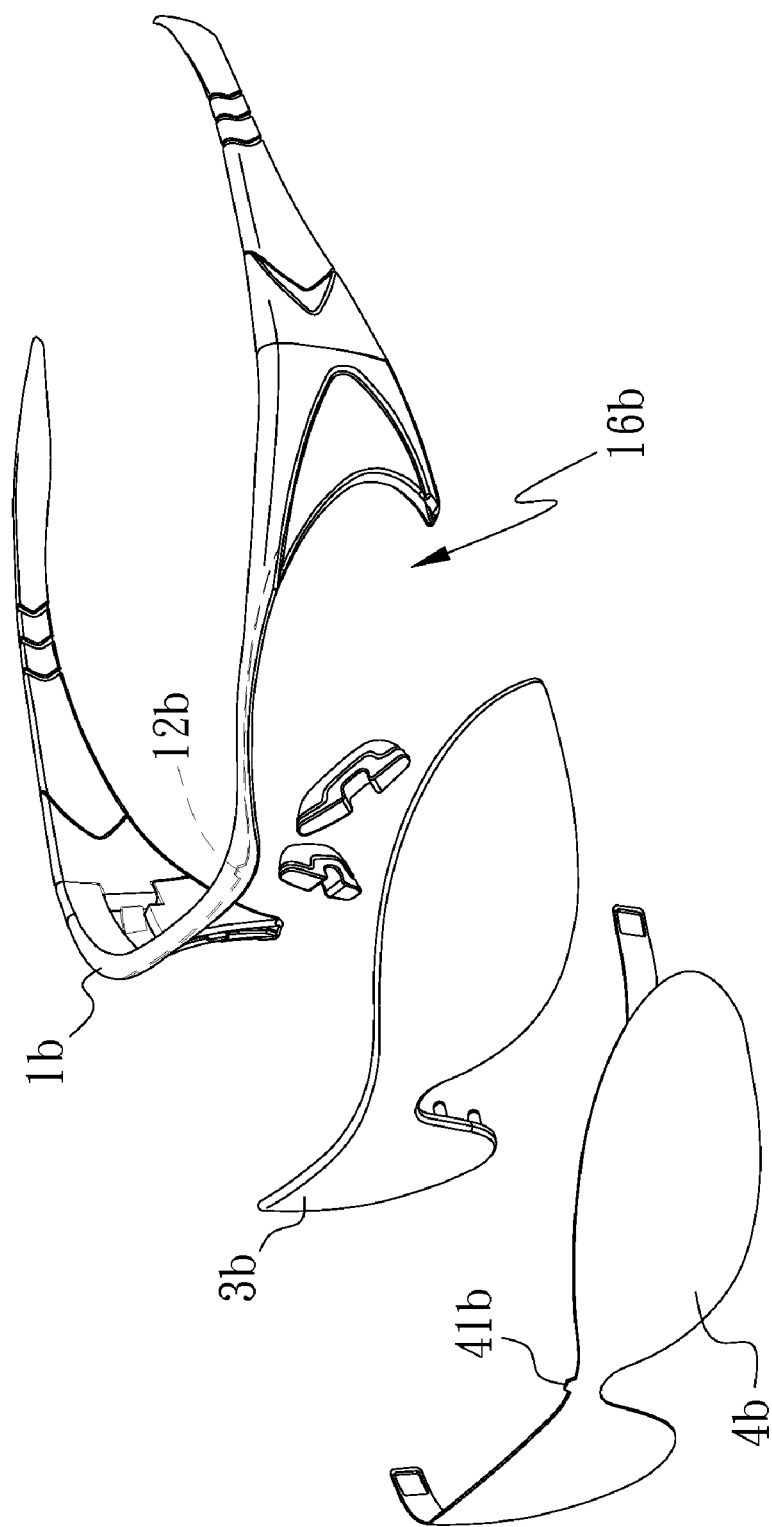
FIG. 12 is an exploded view of another preferred embodiment of the present invention.

With reference to FIGS. 11 and 12 for exploded views of a preferred embodiment and another preferred embodiment of the present invention, the difference of these embodiments from those as shown in FIGS. 1 to 8 resides on that the glasses frame 1b can be interconnected integrally, and an opening 16b is formed at the bottom of the glasses frame 1b, and the first lens 3b and the second lens 4b form a whole-piece lens installed to fit into the glasses frame 1b.

Figure 13:
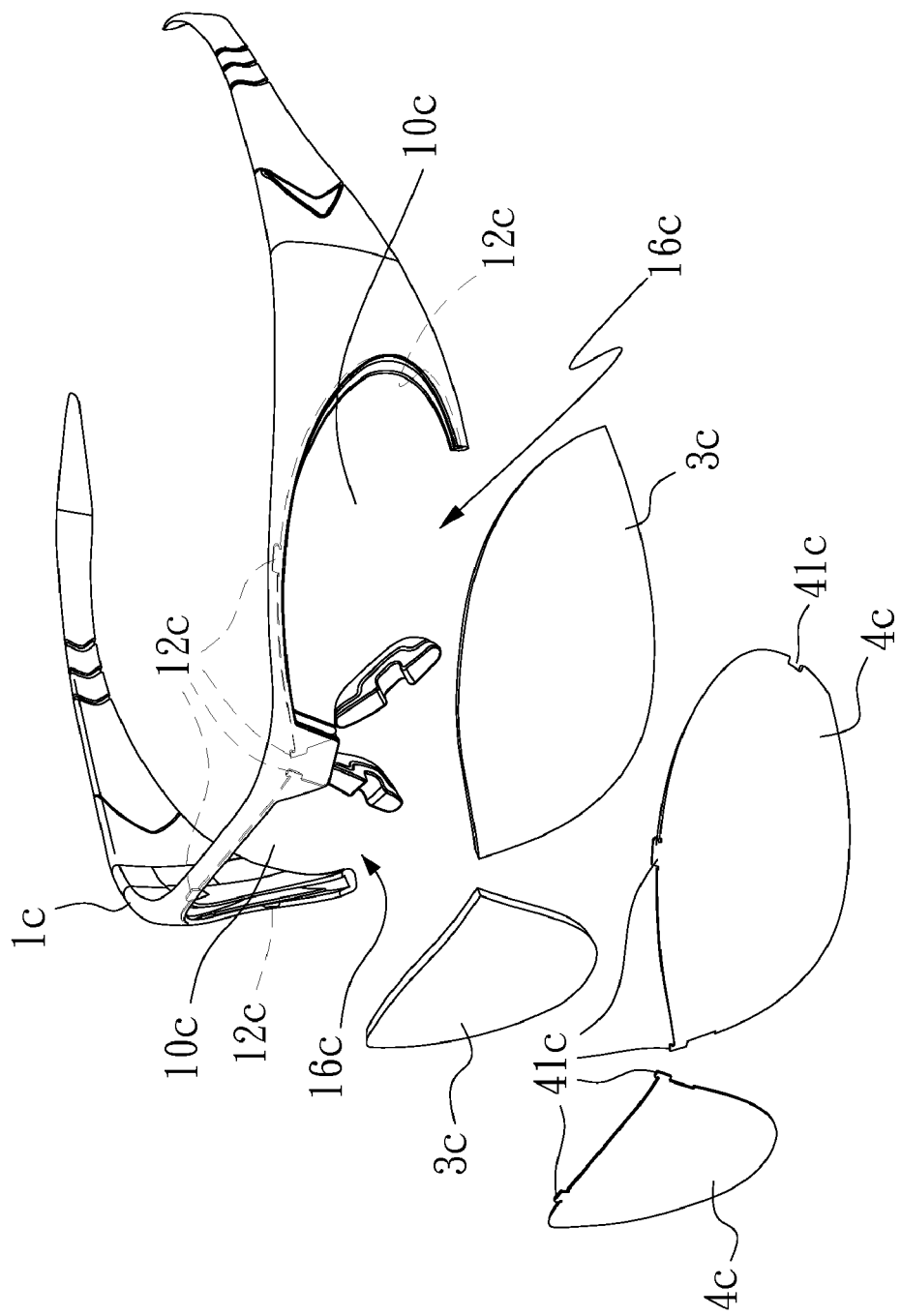
FIG. 13 is an exploded view of a preferred embodiment of the present invention.
Figure 14:
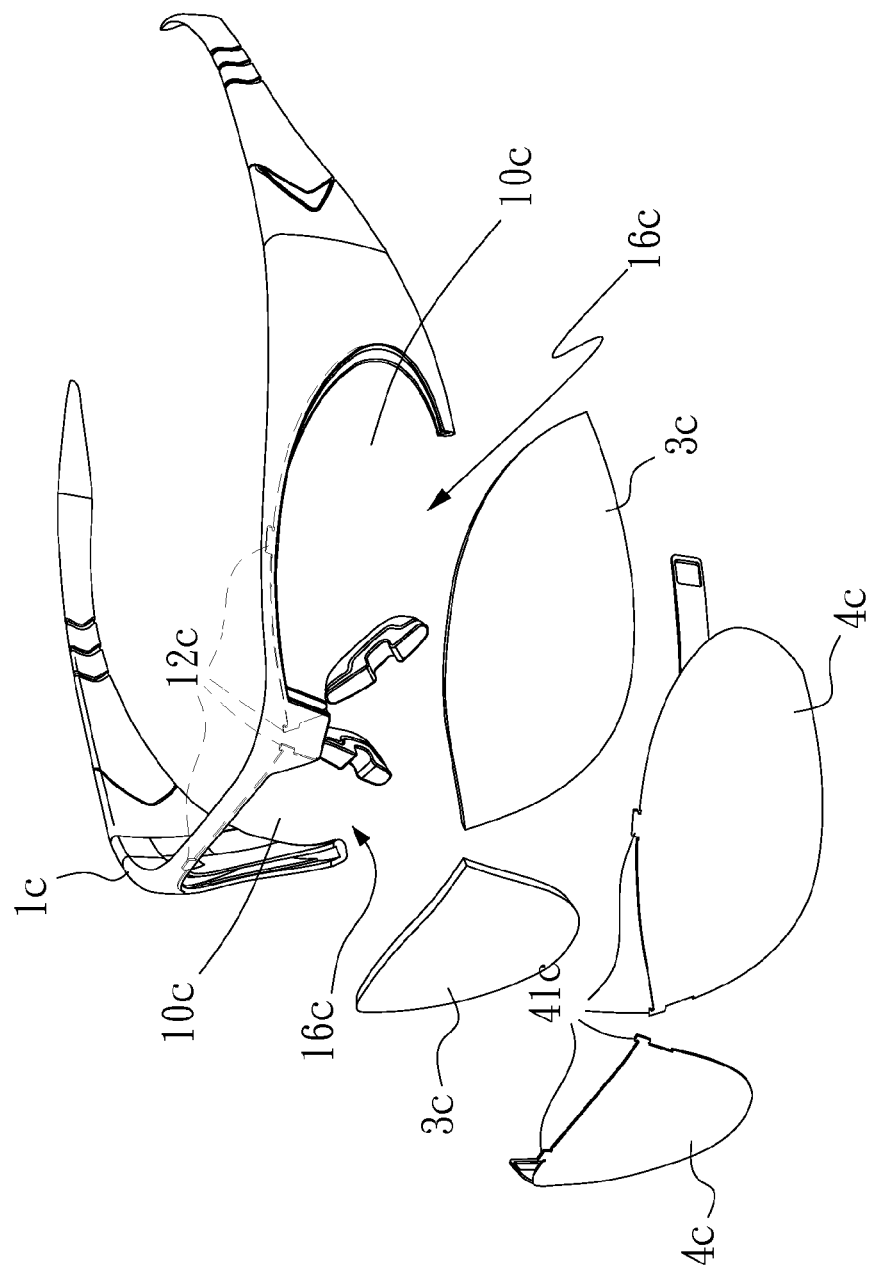
FIG. 14 is an exploded view of another preferred embodiment of the present invention.

With reference to FIGS. 13 and 14 for exploded views of a preferred embodiment and another preferred embodiment of the present invention, the difference of these embodiments from those as shown in FIGS. 1 to 8 resides on that the glasses frame 1c includes two frame bodies 10c disposed adjacent to each other, and an opening 16c is formed at the bottom of the frame bodies 10c, and the first lens 3c and the second lens 4c are two separate lenses are installed onto the frame bodies 1c.

The assembling portions 12, 12a, 12b, 12c can be recessions or protrusions, and the connecting portions 41, 41a, 41b, 41c can be protrusions or recessions to fit the assembling portions 12, 12a, 12b, 12c.

Figure 15:
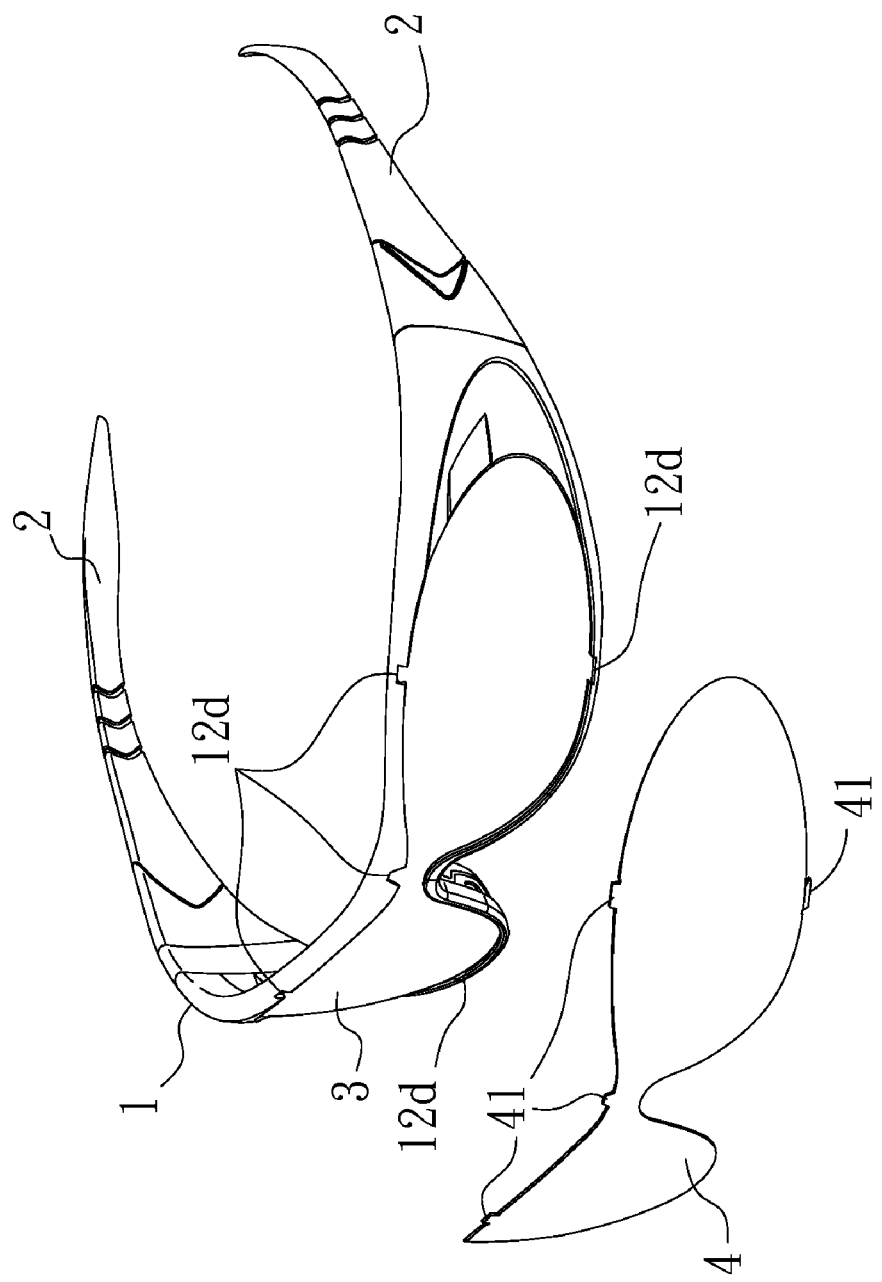
FIG. 15 is a first perspective view of another preferred embodiment of the present invention.
Figure 16:
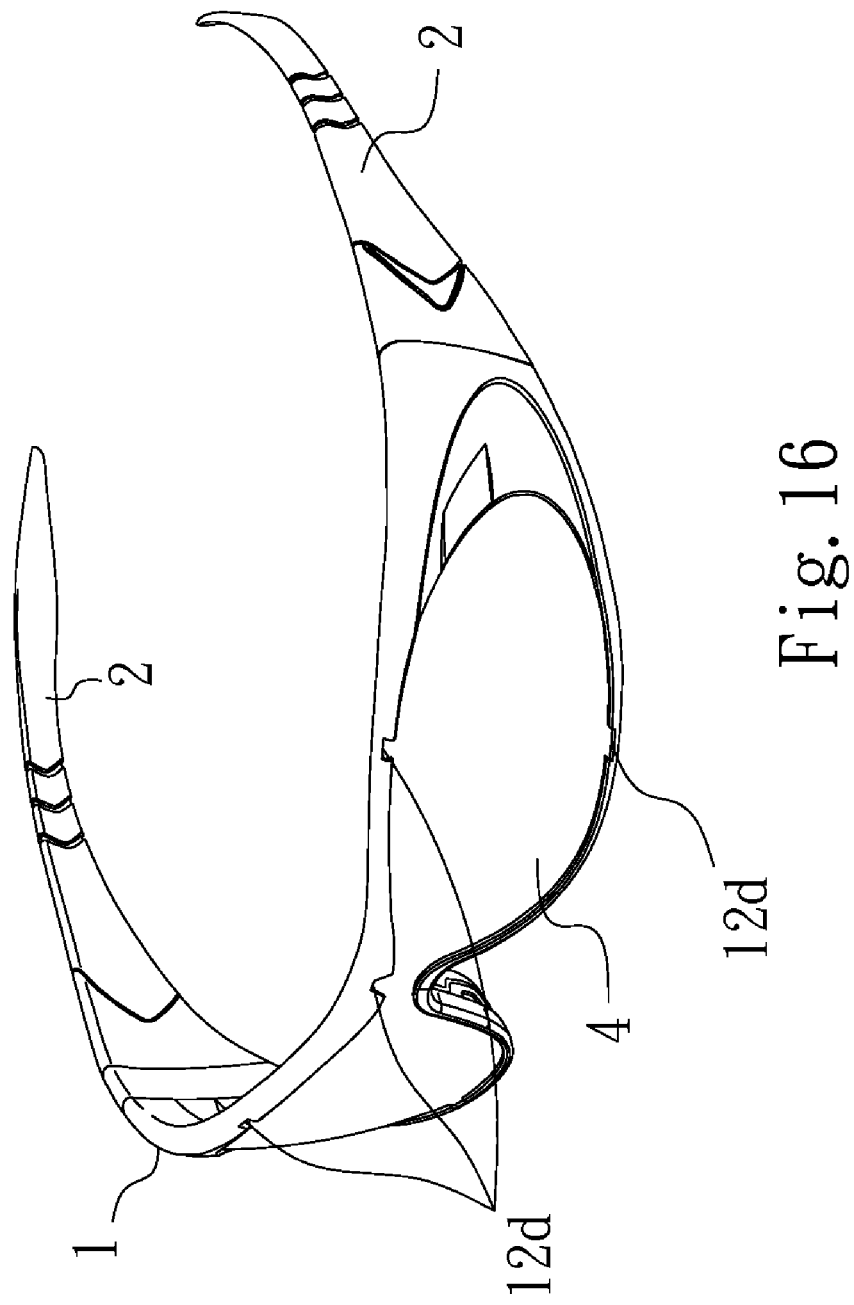
FIG. 16 is a second perspective view of another preferred embodiment of the present invention.

With reference to FIGS. 15 and 16 for perspective views of another preferred embodiment of the present invention, the difference of this embodiment from those as shown in FIGS. 2 and 3 resides on that each of the assembling portions 12d has a notch formed on a front surface of the glasses frame 1. The widths of the connecting portions 41 are slightly larger than that of the notches such that the second lens 4 can be installed outside the first lens 3 by pressing the connecting portions 41 into the notches of the assembling portions 12d respectively. This kind of structure can be also applied to the glasses frames 1a, 1b, 1c.

In summation of the description above, the present invention uses the assembling portions disposed at the internal edge of the glasses frame together with the connecting portions disposed at the periphery of the second lens to engage or detach the second lens with or from the glasses frame, such that the second lens can achieve the effects of shading sunlight, preventing image distortion, providing a secured mount and an easy dismount. In addition, products of the invention can meet the market requirements, and the present invention complies with patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A sunglasses structure, comprising:
a glasses frame, having a position limit slot disposed at an internal edge of the glasses frame and a plurality of assembling portions disposed on an outward side of the position limit slot at the internal edge of the glasses frame;
two glasses legs, respectively and pivotally coupled to either side of the glasses frame;
at least one first lens, installed in the position limit slot of the glasses frame; and
at least one second lens, installed outside the first lens, and having a plurality of connecting portions disposed at the periphery of the second lens and coupled to the assembling portions respectively.

2. The sunglasses structure of claim 1, further comprising a position limiting hole separately penetrating through either side of the glasses frame, an accommodating slot separately disposed on an internal side of the glasses frame and adjacent sides of the position limiting holes, a latch portion separately disposed in the accommodating slots, an extended section passed through at least one side of the second lens, and disposed in the position limiting hole and contained in the accommodating slot, and a fixing hole formed at the extended section and coupled to the latch portion.

3. The sunglasses structure of claim 2, wherein the glasses frame is interconnected integrally, and the first lens and the second lens form a whole-piece lens respectively to fit into the glasses frame.

4. The sunglasses structure of claim 3, wherein the assembling portions are recessions or protrusions, the connecting portions are protrusions or recessions to fit the assembling portions respectively.

5. The sunglasses structure of claim 2, wherein the glasses frame includes two frame bodies disposed adjacent to each other, and the first lens and the second lens are two separate lenses to fit into the frame bodies.

6. The sunglasses structure of claim 5, wherein the assembling portions are recessions or protrusions, the connecting portions are protrusions or recessions to fit the assembling portions respectively.

7. The sunglasses structure of claim 2, wherein the glasses frame is interconnected integrally, and an opening is formed at the bottom of the glasses frame, and the first lens and the second lens form a whole-piece lens respectively to fit into the glasses frame.

8. The sunglasses structure of claim 7, wherein the assembling portions are recessions or protrusions, the connecting portions are protrusions or recessions to fit the assembling portions respectively.

9. The sunglasses structure of claim 2, wherein the glasses frame includes two frame bodies disposed adjacent to each other, and an opening is formed at the bottom of the frame bodies, and the first lens and the second lens are two separate lenses to fit into the frame bodies.

10. The sunglasses structure of claim 9, wherein the assembling portions are recessions or protrusions, the connecting portions are protrusions or recessions to fit the assembling portions respectively.

11. The sunglasses structure of claim 2, wherein the assembling portions are recessions or protrusions, and the connecting portions are protrusions or recessions to fit the assembling portions respectively.

12. The sunglasses structure of claim 1, wherein the glasses frame is interconnected integrally, and the first lens and the second lens form a whole-piece lens respectively to fit into the glasses frame.

13. The sunglasses structure of claim 12, wherein the assembling portions are recessions or protrusions, the connecting portions are protrusions or recessions to fit the assembling portions respectively.

14. The sunglasses structure of claim 1, wherein the glasses frame includes two frame bodies disposed adjacent to each other, and the first lens and the second lens are two separate lenses to fit into the frame bodies.

15. The sunglasses structure of claim 14, wherein the assembling portions are recessions or protrusions, the connecting portions are protrusions or recessions to fit the assembling portions respectively.

16. The sunglasses structure of claim 1, wherein the glasses frame is interconnected integrally, and an opening is formed at the bottom of the glasses frame, and the first lens and the second lens form a whole-piece lens respectively to fit into the glasses frame.

17. The sunglasses structure of claim 16, wherein the assembling portions are recessions or protrusions, the connecting portions are protrusions or recessions to fit the assembling portions respectively.

18. The sunglasses structure of claim 1, wherein the glasses frame includes two frame bodies disposed adjacent to each other, and an opening is formed at the bottom of the frame bodies, and the first lens and the second lens are two separate lenses to fit into the frame bodies.

19. The sunglasses structure of claim 18, wherein the assembling portions are recessions or protrusions, the connecting portions are protrusions or recessions to fit the assembling portions respectively.

20. The sunglasses structure of claim 1, wherein the assembling portions are recessions or protrusions, and the connecting portions are protrusions or recessions to fit the assembling portions respectively.

* * * * *